(12) United States Patent
Hsieh et al.

(10) Patent No.: US 7,489,300 B2
(45) Date of Patent: Feb. 10, 2009

(54) PROGRAMMABLE OPTICAL POINTING DEVICE

(75) Inventors: Chien-Hsing Hsieh, Hsin-Chu (TW); Chin-Hsin Yang, Taipei Hsien (TW)

(73) Assignee: Pixart Imaging Inc., Hsin-Chu (TW)

( * ) Notice: Subject to any disclaimer, the term of this patent is extended or adjusted under 35 U.S.C. 154(b) by 519 days.

(21) Appl. No.: 10/996,554

(22) Filed: Nov. 23, 2004

(65) Prior Publication Data

US 2005/0225536 A1    Oct. 13, 2005

(30) Foreign Application Priority Data

Apr. 12, 2004    (TW) ............... 93110085 A

(51) Int. Cl.
*G09G 5/08*    (2006.01)

(52) U.S. Cl. .............. 345/166; 345/156; 345/157; 345/163

(58) Field of Classification Search ........ 345/156, 345/157, 162, 163, 165, 166
See application file for complete search history.

(56) References Cited

U.S. PATENT DOCUMENTS

| | | | | |
|---|---|---|---|---|
| 4,160,131 A  * | 7/1979 | Kaul et al. | ............ | 370/359 |
| 2002/0057207 A1 * | 5/2002 | Sgambati et al. | ....... | 340/825.25 |
| 2003/0132288 A1 * | 7/2003 | Fulcher et al. | ............ | 235/381 |
| 2003/0179598 A1 * | 9/2003 | Chen | ............ | 365/63 |
| 2004/0017355 A1 * | 1/2004 | Shim | ............ | 345/157 |
| 2005/0190158 A1 * | 9/2005 | Casebolt et al. | ............ | 345/166 |

* cited by examiner

*Primary Examiner*—Sumati Lefkowitz
*Assistant Examiner*—Seokyun Moon
(74) *Attorney, Agent, or Firm*—Tung & Associates

(57) ABSTRACT

A programmable optical pointing device. A read/write storage chip stores control code, and an integrated chip includes a photo sensor array and a control circuit. The control circuit reads the control code from the read/write storage chip and accordingly drives the photo sensor array to detect images on an operating surface.

8 Claims, 6 Drawing Sheets

PROGRAMMABLE OPTICAL POINTING DEVICE

BACKGROUND

The present invention relates to a programmable optical pointing device.

Typically, an optical pointing device has a photo sensor array, a micro-controller unit (MCU), and a memory. The photo sensor array captures images on an operating surface. The MCU determines displacement of the device according to the captured images. The memory stores a control code for the MCU. The three electronic units, the photo sensor array, the MCU, and the memory, are typically integrated on a single chip to save costs. When integrating the three units, the memory must be a static random access memory (SRAM) or a mask read-only memory (mask ROM) due to compatibility requirements in fabrication. The control code stored in the SRAM disappears after the SRAM is powered-off, thus a single chip with a SRAM thereon is not suitable for the optical device. The control code must remain after power-off. Therefore, the optical device typically uses a mask ROM on the single chip to store the code. The control code is written to the mask ROM by mask technology during fabrication.

However, in the design stage, the control code is not finalized and may be modified several times in response to development. If the mask ROM is used as the memory on the single chip to store the control code, the mask ROM must be re-produced by mask technology each time the code is modified.

Alternatively, several chips may be used in the optical pointing device to fulfill the same function. FIG. 1a is a diagram of a conventional optical mouse 10. FIG. 1b shows a photo sensor array 11 and a micro-controller unit (MCU) 12 inside the conventional optical mouse 10 in FIG. 1a. The MCU 12 comprises a memory 13 storing a control code. The memory 13 can be a flash memory or a one time programmable (OTP) memory. In the design stage, new or modified control codes are written to the memory 13 in the MCU 12. During operation, the MCU 12 reads out the control code from the memory 13 and drives the photo sensor array 11 to detect images on an operating surface according to the control code. Then, the MCU 12 calculates correlation between the images captured at different points of time to determine displacement of the optical mouse 10.

The optical mouse uses several chips in the design stage, replaced by a single chip in production stage for cost consideration. Patterns for the printed circuit board (PCB) must be modified from the design stage to production stage. Although the control code is verified in the design stage using several chips, uncertainty still exists when the control code is written to the single chip, creating potential risk and higher costs.

SUMMARY

Accordingly, an embodiment of the invention provides a programmable optical pointing device, comprising a read/write storage chip storing a control code and an integrated chip comprising a photo sensor array and a control circuit, wherein the control circuit reads out the control code from the read/write storage chip and accordingly drives the photo sensor array to detect images on an operating surface.

Also provided is a programmable optical pointing device configuration method, updating a control code used by a control circuit in a programmable optical pointing device, comprising storing the control code in a read/write storage chip, reading of the control code from the read/write storage chip by an integrated chip, and driving a photo sensor array on the integrated chip to detect images on an operating surface according to the control code.

Further provided is another programmable optical pointing device, comprising an integrated chip comprising a photo sensor array and a control circuit, wherein the control circuit comprises a read-only memory storing a control code controlling the photo sensor array, with the control code generated according to the configuration method described above for performance optimization of the programmable optical pointing device.

Computer readable media is also provided, comprising an update program configuring a programmable optical pointing device comprising a read/write storage chip and an integrated chip, wherein the integrated chip comprises a photo sensor array and a control circuit, and the update program, executed by a computer, determines an operating mode of the programmable optical pointing device, writes a control code in the read/write storage chip when the operating mode is an update mode, and receives displacement of the programmable optical pointing device when the operating mode is normal mode, wherein the control circuit drives the photo sensor array to detect images on an operating surface according to the control code stored in the read/write storage chip and determines displacement of the programmable optical pointing device according to the images.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1b shows a photo sensor array and a micro-controller unit (MCU) inside the conventional optical mouse in FIG. 1a.

FIG. 2b shows an integrated chip and electrically erasable programmable read-only memory (EEPROM) inside the optical mouse in FIG. 2a.

FIG. 4b shows an integrated chip inside the optical mouse in FIG. 4a.

DETAILED DESCRIPTION

Figure 1A:
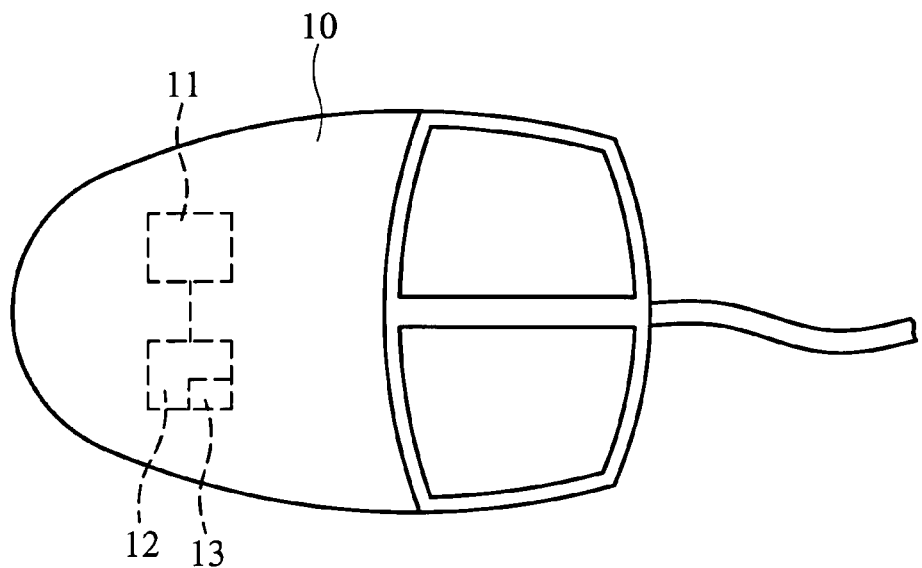
FIG. 1a is a diagram of a conventional optical mouse.
Figure 1B:
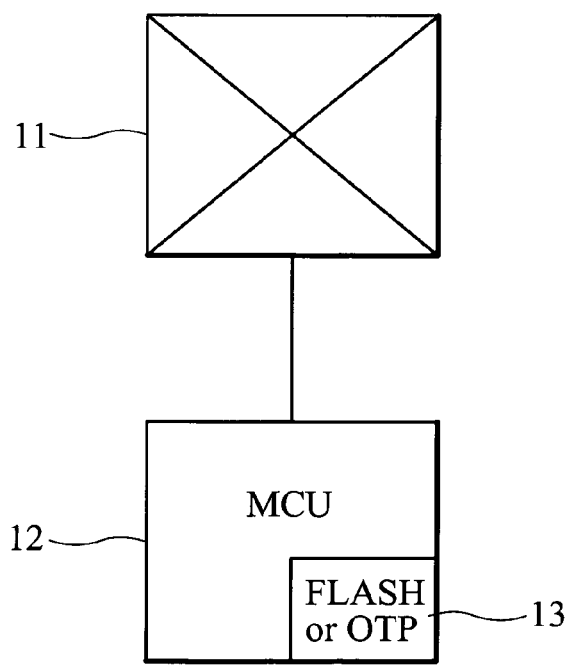
Figure 2A:
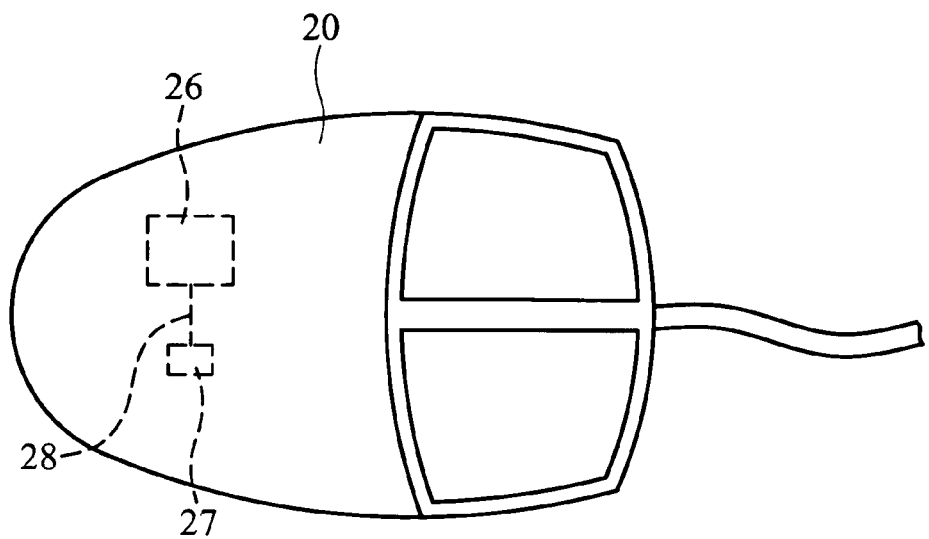
FIG. 2a is a diagram of an optical mouse according to an embodiment of the invention.
Figure 2B:
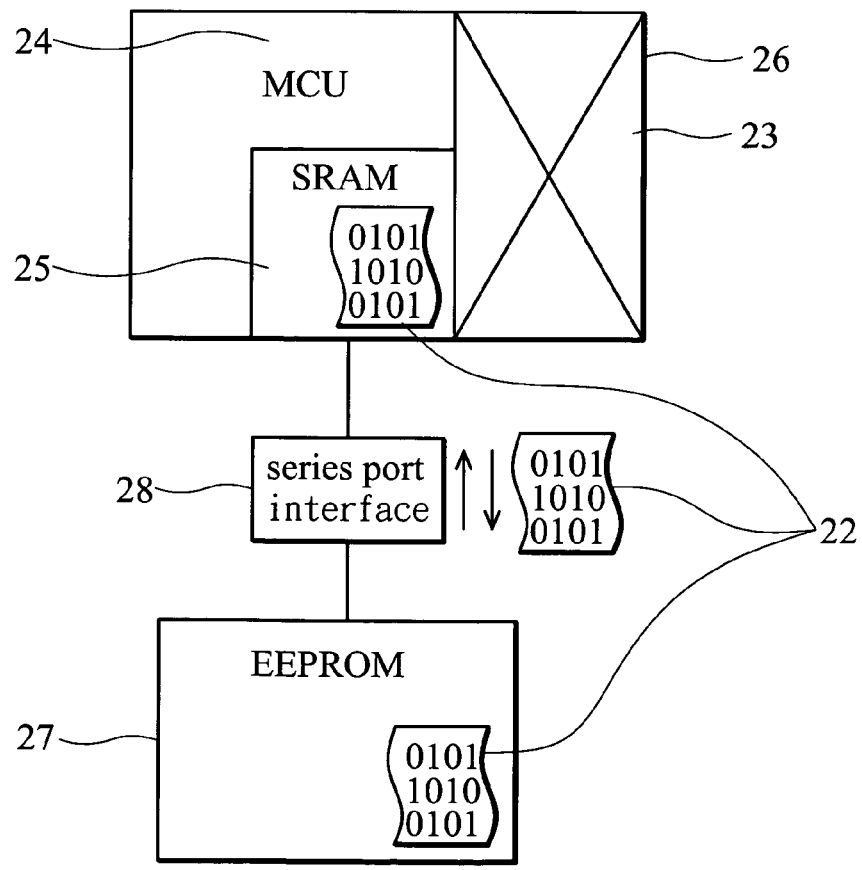

FIG. 2a is a diagram of an optical mouse 20 according to an embodiment of the invention. FIG. 2b shows an integrated chip 26 and electrically erasable programmable read-only memory (EEPROM) 27 inside the optical mouse 20 in FIG. 2a. As shown, the optical mouse 20 comprises an integrated chip 26 and an EEPROM 27, with data transmitted therebetween via a series port interface 28 on a printed circuit board (PCB). The EEPROM 27 is a non-volatile storage chip capable of repeated read/write operations, storing a control code 22. The integrated chip 26 comprises a photo sensor array 23 and a micro-controller unit (MCU) 24. The MCU 24 comprises a static random access memory (SRAM) 25. During operation, the MCU 24 checks in advance whether the optical mouse 20 is connected with the EEPROM 27 externally. If so, the MCU 24 reads the control code 22 from the EEPROM 27 via the series port interface 28 and then stores the control code 22 in the SRAM 25. When the optical mouse 20 is switched to normal mode, the MCU 24 drives the photo sensor array 23 to detect images on an operating surface according to the control code 22 in the SRAM 25. When the operating mode is switched to update mode, the control code 22 in the EEPROM 27 is updated.

Because the EEPROM 27 and the SRAM 25 are capable of repeated read/write operations, functions of the optical mouse 20 can be adjusted by modifying the control code 22 during design of the optical mouse 20. When new control code 22 is written to the EEPROM 27, the new control code 22 is read out by the MCU 24 for storage in the SRAM 25. The MCU 24 drives the photo sensor array 23 to detect images on the operating surface according to the new control code 22. Thus, the optical mouse 20 can perform various functions by loading different control codes 22. Similarly, the control code 22 can be optimized by continuous modification and function testing of the optical mouse 20.

Figure 3:
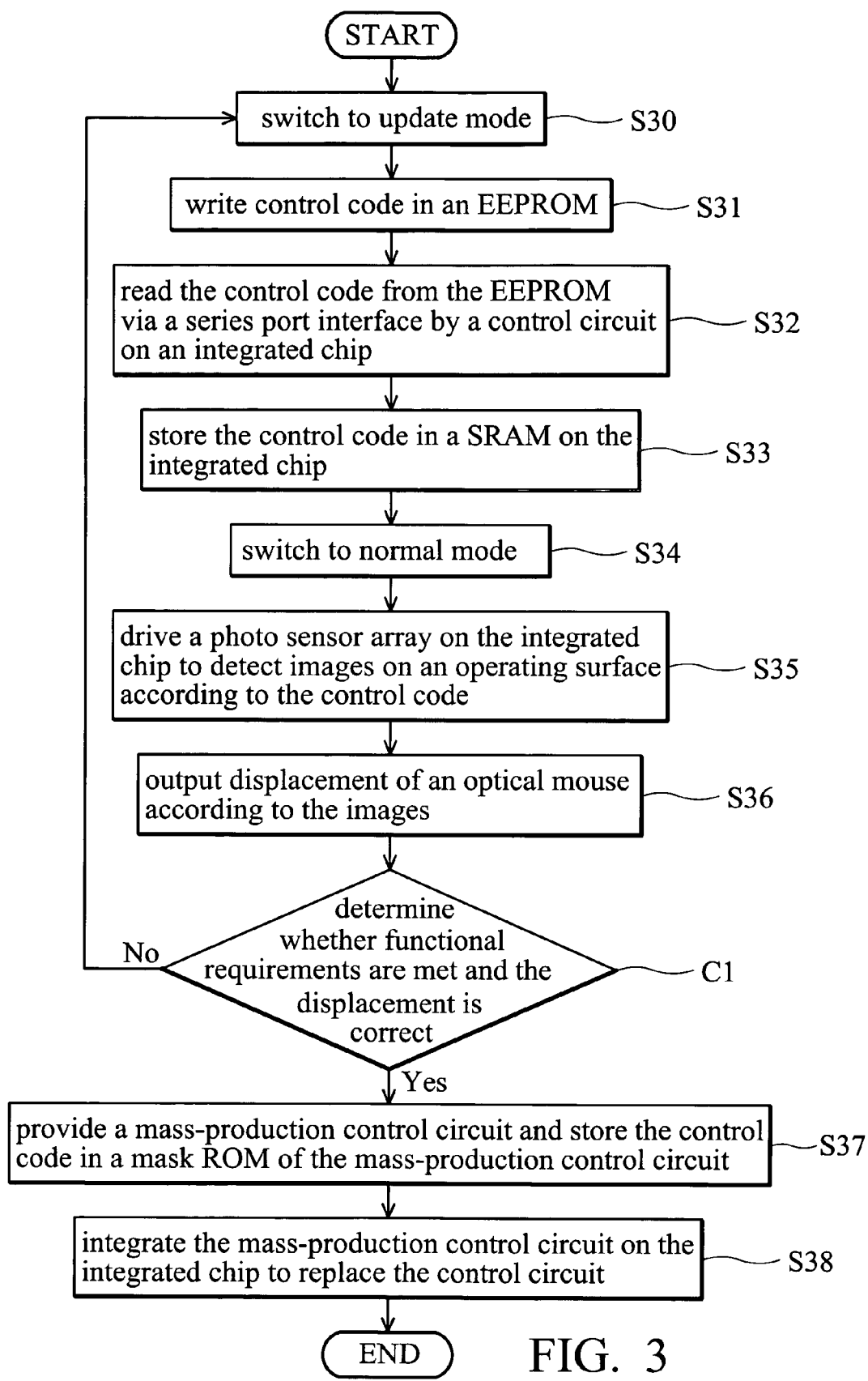
FIG. 3 is a flowchart of design to production of an optical mouse according to an embodiment of the invention.

FIG. 3 is a flowchart of design to production of the optical mouse 20. Step S30 to conditional C1 belong to the design stage, and steps S37 and S38 belong to the production stage. The structure of the optical mouse 20 in the design stage is described previously and shown in related drawings. First, in step S30, the optical mouse 20 is switched to update mode. Next, in step S31, new control code 22 is written to the EEPROM 27. In step S32, the MCU 24 on the integrated chip 26 reads the new control code 22 from the EEPROM 27 via the series port interface 28. In step S33, the MCU 24 stores the new control code 22 in the SRAM 25 in the MCU 24 on the integrated chip 26. Then, in step S34, the optical mouse 20 is switched to normal mode. Next, in step S35, the MCU 24 drives the photo sensor array 23 on the integrated chip 26 to detect images on the operating surface according to the new control code 22 in the SRAM 25. Finally in step S36, according to the images, the MCU 24 outputs displacement of the optical mouse 20 for function testing of the optical mouse 20.

Next, in conditional step C1, it is determined whether functional requirements of the optical mouse 20 are met and the displacement thereof is correct. If functional requirements are not met, the process returns to step S30. In step S30, the optical mouse 20 is switched to update mode. Another new control code 22 is used in the following steps S31 to S36. Steps S30 to conditional step C1 are repeated until functional requirements of the optical mouse 20 are met. If functional requirements are met, the process proceeds to steps S37 and S38 for production of the optical mouse 20.

In production, when appropriate control code 22 is decided, in step S37, a new MCU is provided as a production control circuit, wherein the logic circuitry of the new MCU is the same as that of the MCU 24 in the design stage. A mask read-only memory (mask ROM) is used in the new MCU for replacement of the SRAM 25 of the MCU 24 in the design stage, and the appropriate control code 22 is written to the mask ROM. Then, in step S38, the new MCU, the mass-production control circuit, is integrated on the integrated chip 26 to replace the MCU 24.

Figure 4A:
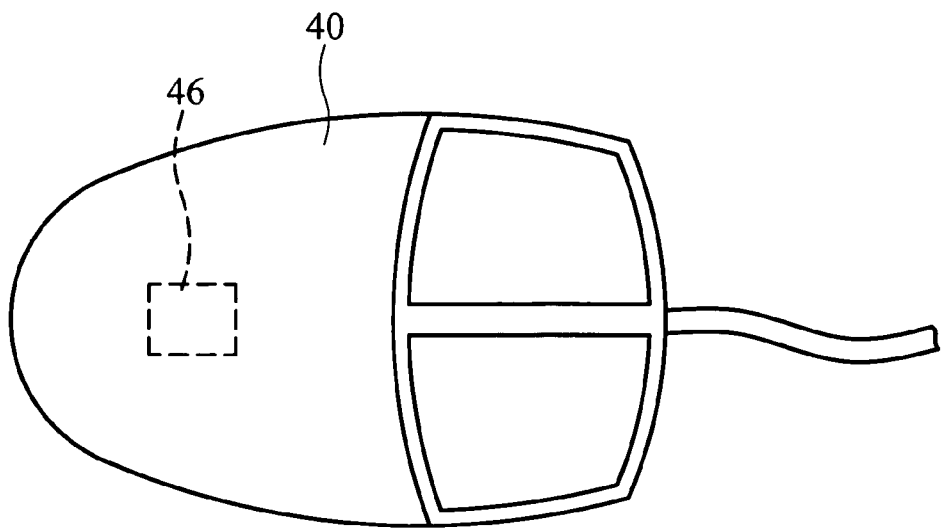
FIG. 4a is a diagram of an optical mouse manufactured according to the processes in FIG. 3.
Figure 4B:
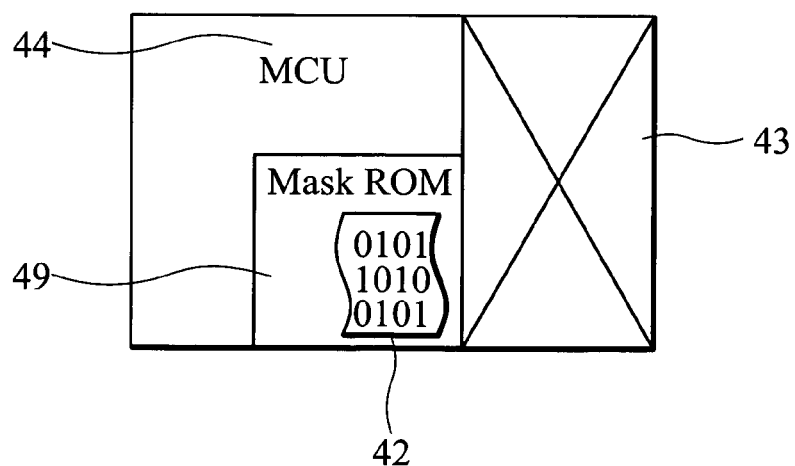

FIG. 4*a* is a diagram of an optical mouse 40 manufactured according to the processes in FIG. 3. FIG. 4*b* shows an integrated chip 46 inside the optical mouse 40 in FIG. 4*a*. As shown, the integrated chip 46 comprises a photo sensor array 43 and a MCU 44. The MCU 44 comprises a mask ROM 49, storing control code 42. Generated by steps S31 to S35 in the design stage in FIG. 3, the control code 42 allows the optical mouse 40 to meet functional requirements. The MCU 44 drives the photo sensor array 43 on the integrated chip 46 to detect images on the operating surface according to the control code 42 stored in the mask ROM 49. During operation, the MCU 44 outputs displacement of the optical mouse 40 according to the images.

Figure 5:
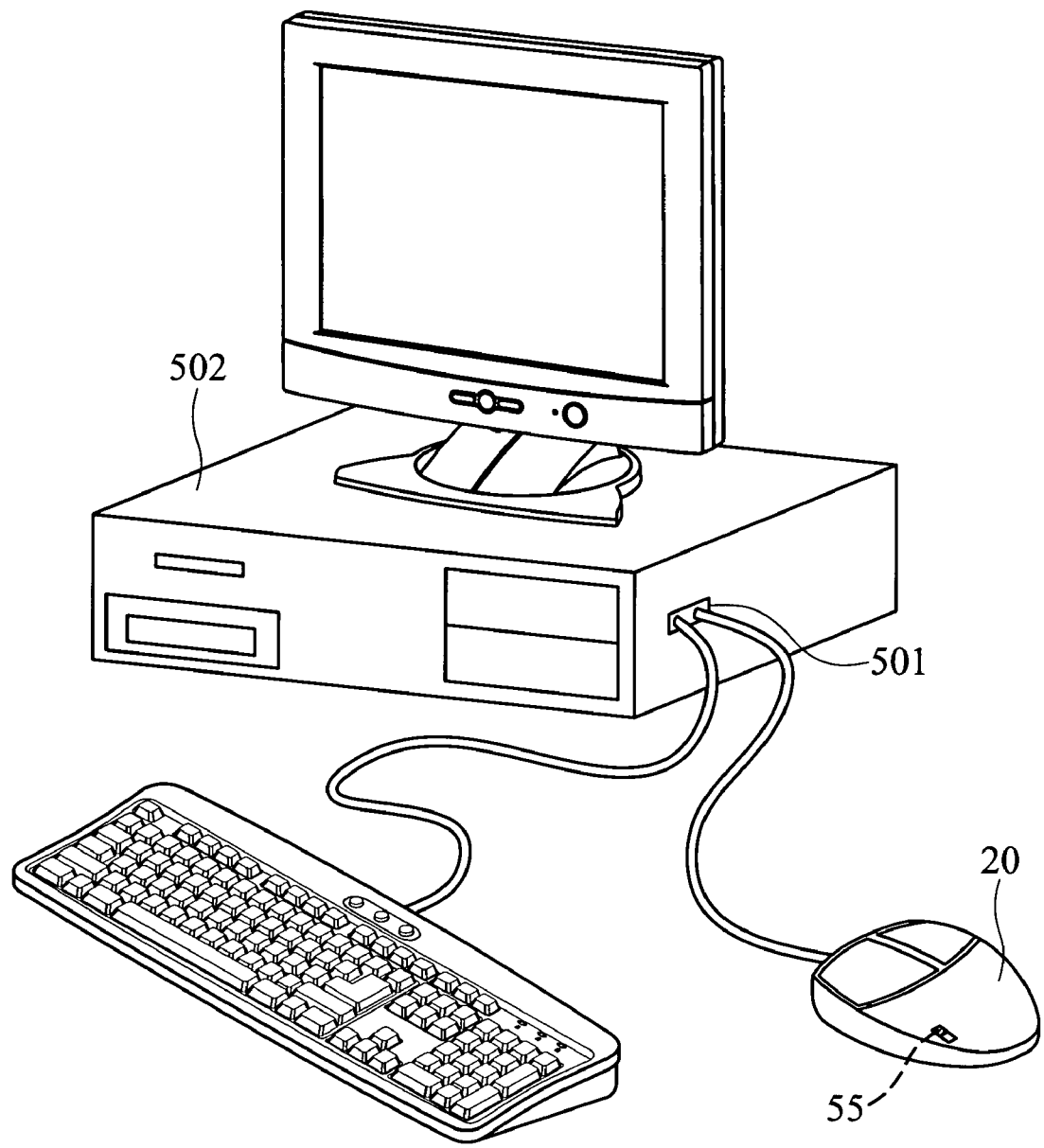
FIG. 5 shows connection between an optical mouse according to an embodiment of the invention and a personal computer (PC) configuring the optical mouse.

FIG. 5 shows connection between the optical mouse 20 and a personal computer (PC) 502 configuring the optical mouse 20. As shown in FIG. 5, the optical mouse 20 connects to the PC 502 via a universal serial bus (USB) interface 501. The optical mouse 20 comprises a switch 55 for switching operating modes thereof. When the optical mouse 20 is switched to normal mode, the optical mouse 20 is operated as an input device of the PC 502. When the optical mouse 20 is switched to update mode, the control code 22 thereof can be updated by the PC 502. The PC 502 comprises a hard disc (not shown in drawings) storing an update program. PC 502 execution of the update program is shown in FIG. 6.

Figure 6:
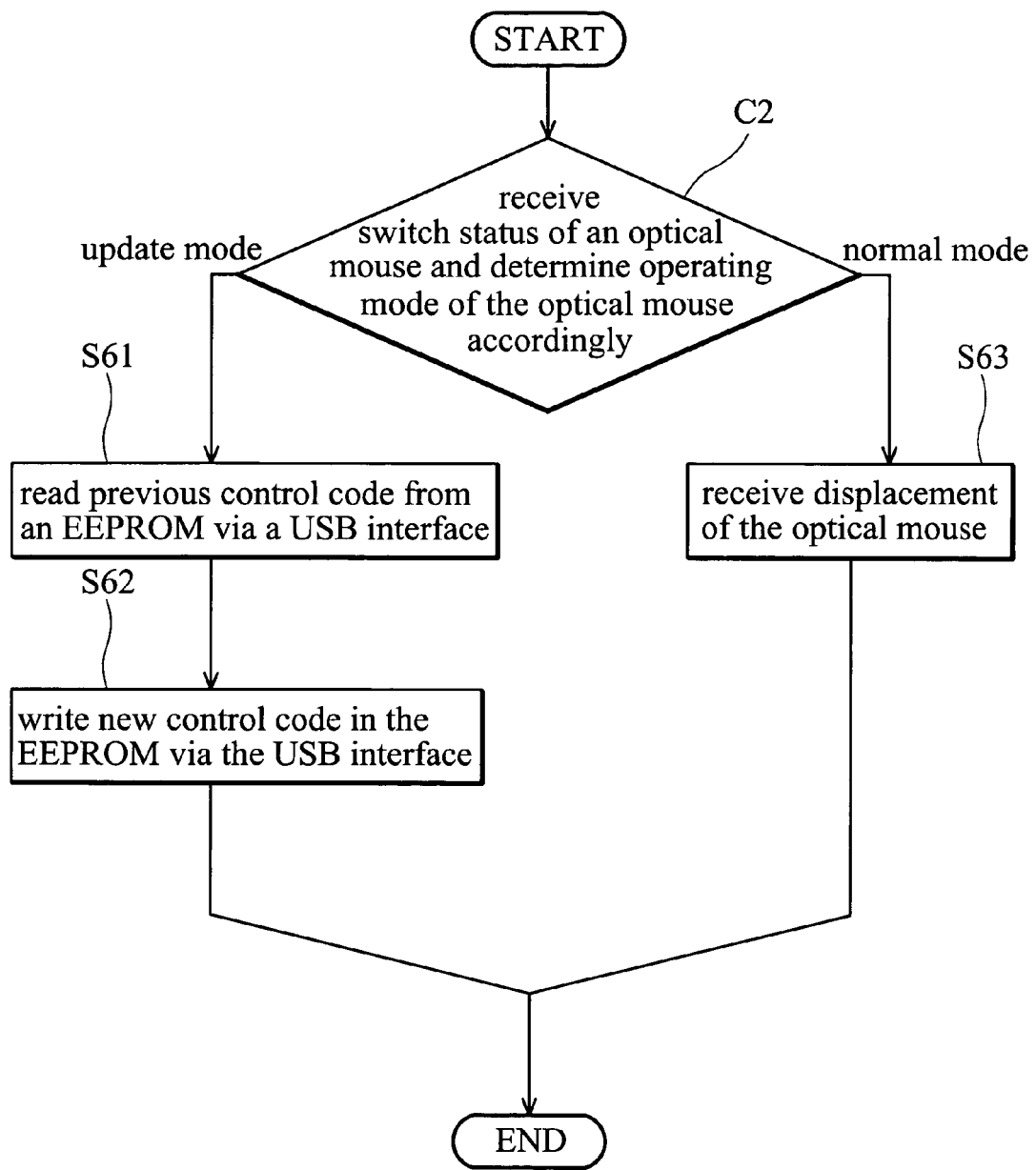
FIG. 6 is a flowchart showing a PC configuring an optical mouse according to an embodiment of the invention.

FIG. 6 is a flowchart showing the PC 502 configuring the optical mouse 20. As shown in FIG. 6, first in conditional step C2, the PC 502 receives status of the switch 55 of the optical mouse 20 via the USB interface 501 to determine the operating mode thereof. If the switch 55 indicates update mode, the PC 502 executes steps S61 and S62. In step S61, the PC 502 reads previous control code 22 from the EEPROM 27 via the USB interface 501 for backup to the hard disc. Next, in step S62, the PC 502 writes a new control code 22 to the EEPROM 27 via the USB interface 501. Thus, configuration at the PC is accomplished, and the update program ends.

Alternatively, if the switch 55 indicates normal mode, the PC 502 executes step S63, receiving displacement of the optical mouse 20 driving a displayed cursor. When the optical mouse 20 is in normal mode, as shown in steps S31 to S35 in the design stage in FIG. 3, the MCU 24 writes the new control code 22 to the SRAM 25 in advance. Thus, the MCU 24 drives the photo sensor array 23 to detect images on the operating surface according to the new control code 22. According to the images, the MCU 24 then determines displacement of the optical mouse 20 for output to the PC 502.

The MCU and the photo sensor array can be integrated on a single chip (system on chip, SOC) to reduce production cost and power consumption.

Different control codes can also be written to the optical mouse according to an embodiment of the invention in design stage for functional testing to generate appropriate control code therefrom, thus enhancing design flexibility.

Control codes can be verified several times for optimization, with the optimized control code then written to the read-only memory of the MCU, reducing production cost.

SRAMs used in the design stage can be easily changed to mask ROMs by modifying processes of mask technology during fabrication. The pins of the single chip remain the same from design to production stage.

Control codes can be software, such as programs in C or Assembly, stored in memories or other storage media, and can be shared between system manufacturers and IC design companies via Internet or e-mail.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical pointing device configuration method, for providing a control code to a control circuit in the optical pointing device, comprising:
   providing a programming mode integrated chip including a static random access memory and a read/write storage chip electrically connected with the programming mode integrated chip;
   storing the control code in the read/write storage chip;
   reading of the control code from the read/write storage chip by the programming mode integrated chip, and storing the control code in the static random access memory on the programming mode integrated chip;
   driving a photo sensor array on the programming mode integrated chip to detect images on an operating surface according to the control code;
   providing a mass-production integrated chip including a mask ROM;
   storing the control code in the mask ROM of the mass-production integrated chip; and
   replacing the programming mode integrated chip and the read/write storage chip by the mass-production integrated chip.

2. The configuration method as claimed in claim 1, wherein the integrated chip and the read/write storage chip are disposed in an optical mouse, the configuration method further comprising a step of outputting a displacement of the optical mouse according to the images.

3. The configuration method as claimed in claim 1, wherein the control code is stored in an electrically erasable programmable read-only memory (EEPROM).

4. The configuration method as claimed in claim 1, wherein the control circuit of the optical pointing device is a micro-controller unit.

5. The configuration method as claimed in claim 1, wherein the control code is read from the read/write storage chip via a series port interface by the control circuit on the integrated chip.

6. An optical pointing device, comprising an integrated chip comprising a photo sensor array and a control circuit, wherein the control circuit comprises a read-only memory storing a control code controlling the photo sensor array, and the control code is generated according to the configuration method as claimed in claim 1 for performance optimization of the optical pointing device.

7. The optical pointing device as claimed in claim 6, wherein the control circuit is a micro-controller unit (MCU).

8. The optical pointing device as claimed in claim 6, wherein the read-only memory is a mask read-only memory (mask ROM).

* * * * *